Figure 9:
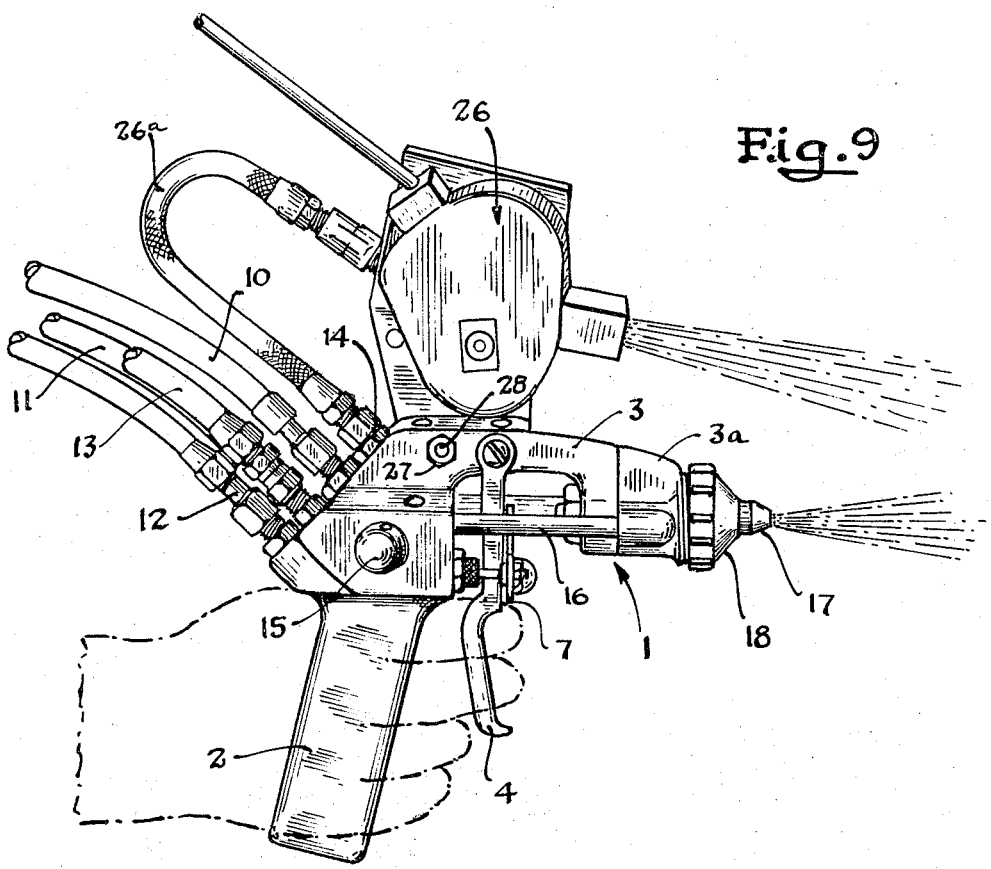

July 11, 1967     J. JOHNSON ET AL     3,330,484
SPRAYING DEVICE
Filed Dec. 6, 1965     4 Sheets-Sheet 1
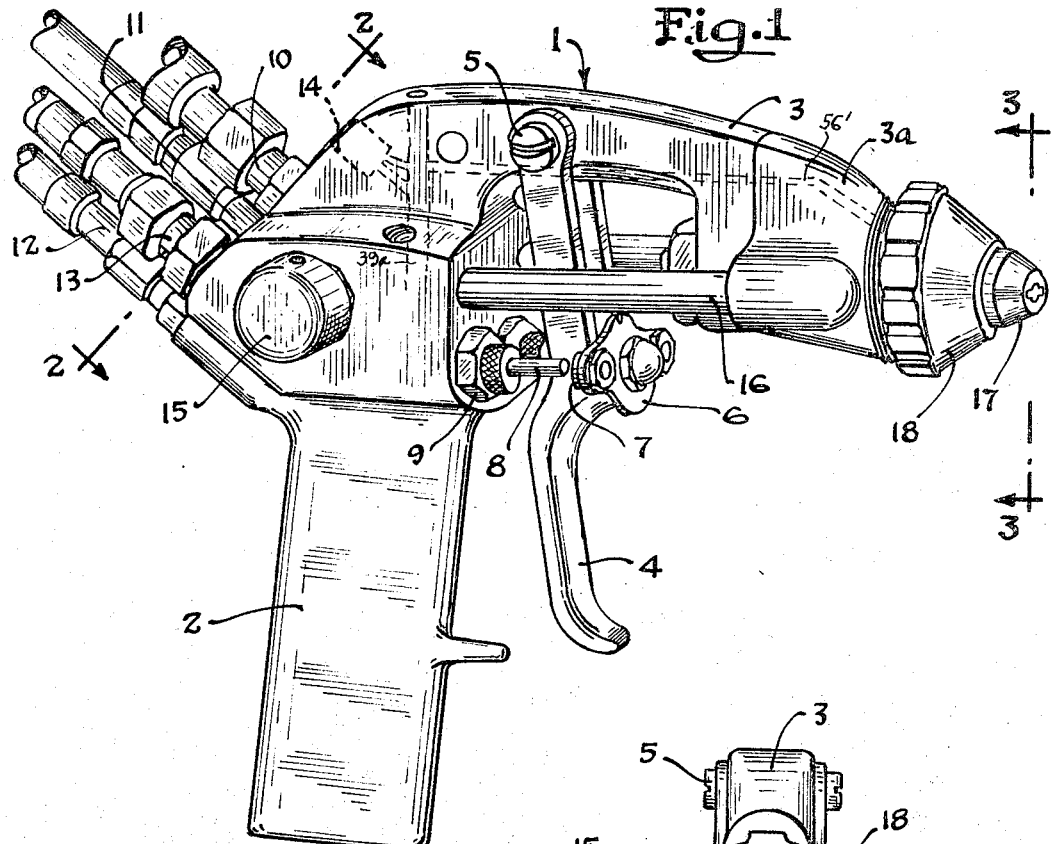
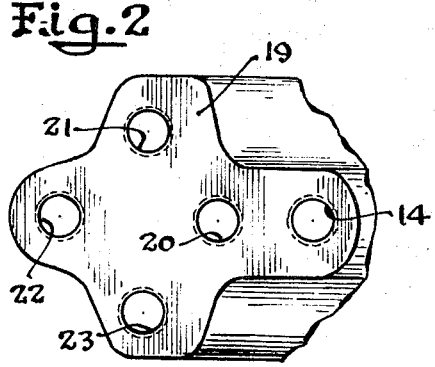
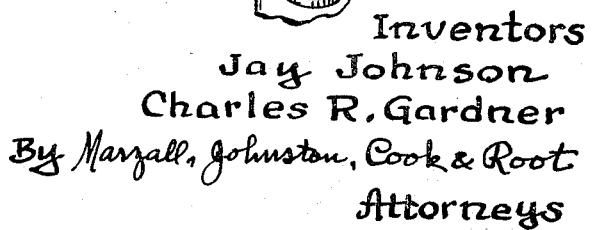
Inventors
Jay Johnson
Charles R. Gardner
By Marzall, Johnston, Cook & Root
Attorneys July 11, 1967
J. JOHNSON ET AL
3,330,484
SPRAYING DEVICE
Filed Dec. 6, 1965
4 Sheets—Sheet 2
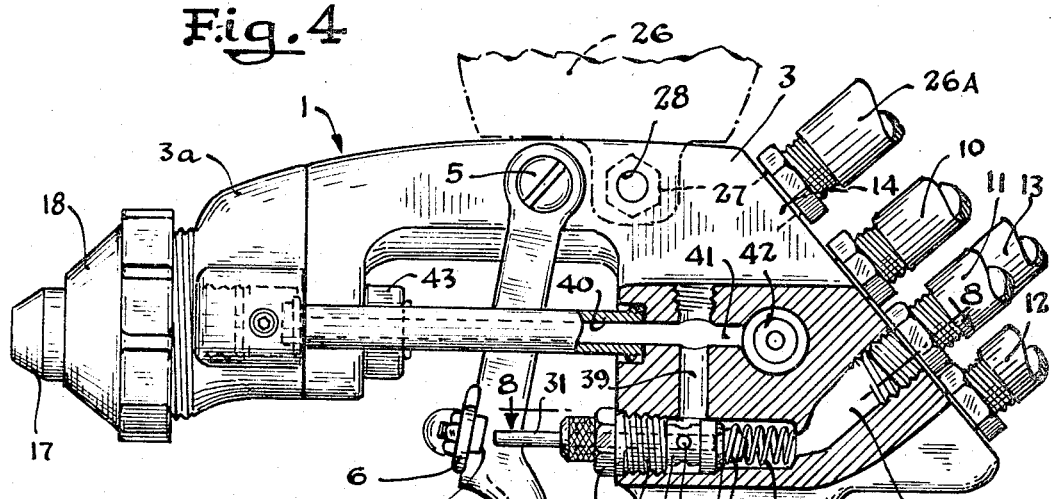
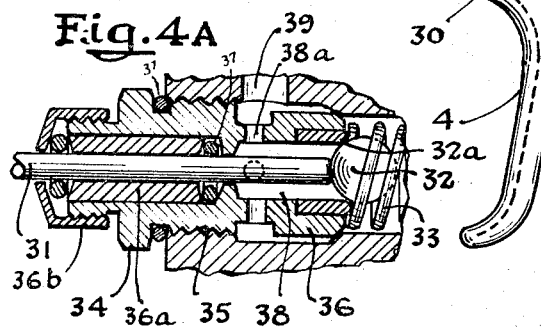
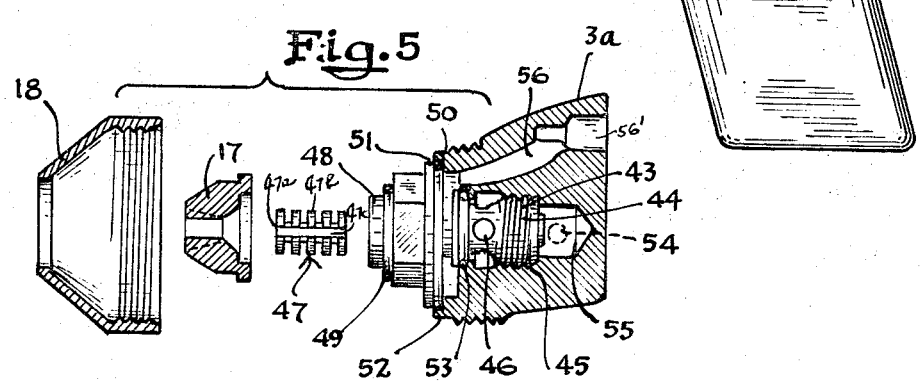
Inventors
Jay Johnson
Charles R. Gardner
By Marzall, Johnston, Cook & Root
Attorneys July 11, 1967  J. JOHNSON ET AL  3,330,484
SPRAYING DEVICE
Filed Dec. 6, 1965
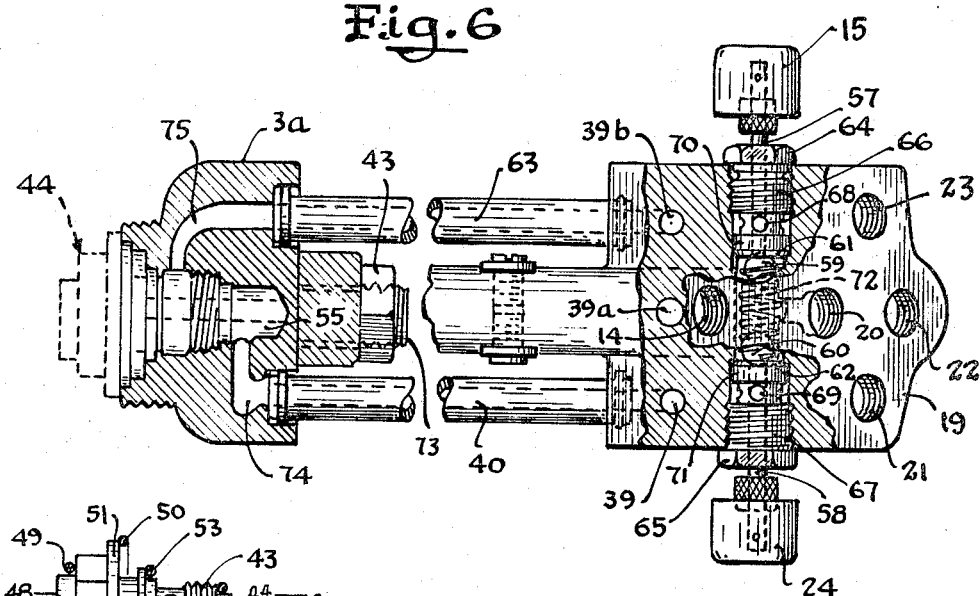
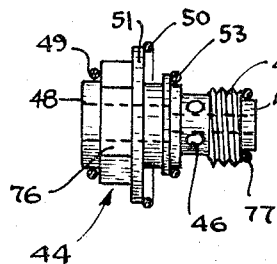
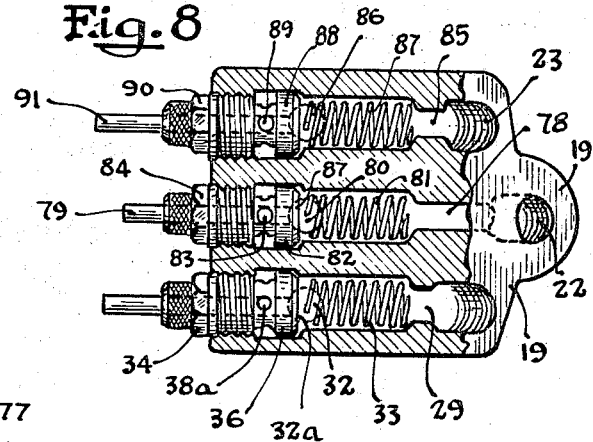
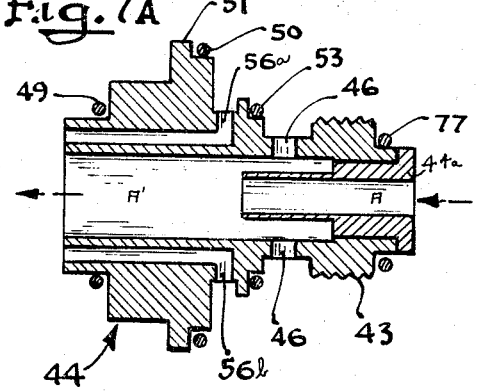
Inventor
Jay Johnson
Charles R. Gardner
By Marzall, Johnston, Cook & Root
Attorneys July 11, 1967  J. JOHNSON ET AL  3,330,484
SPRAYING DEVICE Filed Dec. 6, 1965  4 Sheets-Sheet 4

Inventors
Jay Johnson
Charles R. Gardner
By Marzall, Johnston, Cook & Root
Attorneys United States Patent Office 3,330,484
Patented July 11, 1967

3,330,484
SPRAYING DEVICE
Jay Johnson, 5350 Jessen Drive, and Charles R. Gardner, 2158 La Canada Crest Drive, both of La Canada, Calif. 91011
Filed Dec. 6, 1965, Ser. No. 517,145
11 Claims. (Cl. 239—414)

The present application is a continuation-in-part of application Ser. No. 226,249 which was filed on Sept. 26, 1962.

The present invention is directed to an improved spray gun. More particularly, the subject invention is directed to a lightweight, hand-held spray gun which can be used to spray a variety of thermosetting plastics, catalyzed glues, gel coats, liquid foams, etc.

In many commercial operations it has become standard procedure to use spray guns which are operated by compressed air in forming and finishing various products. In certain instances more than one ingredient is passed through the gun. When a polyester resin is being formed, for example, the catalyst is kept apart from the monomeric component (styrene) and the linear polymer component of the resin to prevent a presetting of the plastic. The components usually are united in an area beyond the tip of the spray nozzle. Most often, the polyester resin is combined with chopped fiberglass, which is sprayed in to the resin pattern. Guns of this type have also been used ot spray catalyst glues, gel coats, liquid foams, and the like.

Spray guns that are presently used in the type of process described above have not been fully satisfactory. Certain of the available equipment is not capable of handling a sufficient number of components. Furthermore, many of the guns are inconvenient to handle over extended periods. In most cases, for example, it is necessary to drag several hoses along the floor when using such guns. A further disadvantage of many of the available guns is that they are difficult to clean. If resin sets up within the gun it is often necessary to disassemble the device to obtain satisfactory cleaning.

It is an object of the present invention to provide an improved spray gun for applying thermosetting plastics, catalyst glue, liquid foams, etc., to forms.

Another object of the invention is to provide an improved spray gun which can be handled without difficulty by an operator.

Still another object of the invention is to provide a spray gun which can be cleaned without difficulty and without disassembling the device.

Still another object of the invention is to provide a spray gun which can be operated by a single trigger.

A further object of the invention is to provide a gun which can be operated in association with the spraying device for chopped fiberglass.

Other objects will become apparent to those skilled in the art from the following detailed description of the invention.

The invention can be more fully understood by reference to the attached drawings in which:

FIGURE 1 is a perspective view of the spray gun;
FIGURE 2 is a view taken along line 2—2 of FIG. 1;
FIGURE 3 is a front elevation taken along line 3—3 of FIG. 1;
FIGURE 4 is a side elevation partly in section of the spray gun;
FIGURE 4A is an expanded view of a valve assembly of the gun;
FIGURE 5 is an exploded view of the nozzle and associated parts of the spray gun;
FIGURE 6 is a top plan view partially in section;
FIGURE 7 is a detailed view of a portion of the nozzle assembly;
FIGURE 7A is a detailed view of an alternate nozzle assembly;
FIGURE 8 is a sectional view taken through line 8—8 of FIG. 4; and
FIGURE 9 shows the gun in operation.

In FIG. 1, spray gun 1 is shown as including handle 2, body 3 and head 3a. Trigger 4 is movably attached to body 3 by means of axle or pin 5. Rotatably attached to trigger 4 is selector bar 6. Bar 6 can be set in any one of three positions as will be described more fully below. In its level position, contact point 7 of bar 6 can engage plunger 8 of valve unit 9. The mounting platform of the gun is arranged to accommodate five hose connections. The platform preferably is angled about 30–60° from horizontal. This arrangement makes it convenient to connect the gun to hoses carried by overhead booms or over the operator's shoulder. Hose connections 10, 11, 12, and 13 are shown mounted on the platform. The platform also includes opening 14 which is designed to accommodate a hose connected to a fiberglass chopper as will be more fully described below. When the chopper is in use air from hose connection 12 passes out opening 14. When the chopper is not being used, opening 14 can be closed allowing the air to pass to the nozzle chamber of the gun. Flush button 15 is mounted on body 3 of gun 1. When the button is depressed a valve is opened allowing solvent to flow from a hose attached to hose connection 10 into flow line 16 and out nozzle 17. A comparable flush button is located on the opposite side of the gun. The nozzle assembly includes nozzle 17 and collar 18. The other parts of the nozzle assembly will be more fully described in connection with other figures.

FIG. 2 is a fragmentary view taken along line 2—2 of FIG. 1. Mounting platform 19 is shown as including openings 14, 20, 21, 22 and 23. In a specific embodiment of the invention wherein the connection is to be used to spray polyester resin, the resin would be delivered from a drum by a high pressure pump to opening 21. Atomizing air carrying vaporized catalyst would be injected through opening 23. Solvent is passed from a suitable container through opening 20 in the platform. Opening 22 is designed to accommodate an air hose, and opening 14 accommodates an air hose which is attached to a pneumatic motor for cutting up fiberglass strands.

FIG. 3 is a front elevation taken along line 3—3 of FIG. 1. This view shows the relationship between flush button 15 and its counterpart flush button 24. Selector bar 6 is shown as being pivotally mounted on trigger 4 by means of nut 25. Also shown is collar 18 of nozzle 17.

FIG. 4 is a side elevation partly in section of the gun. Chopper 26 is mounted on body 3 of gun 1 by means of nut 27 and bolt 28. Air line 26a for chopper 26 is positioned immediately above connections 10, 11, 12, and 13. Hose connection 11 and opening 21 communicate with passage 29. When trigger 4 is depressed contact point 30 engages plunger 31 forcing ball 32 away from valve seat 32a and against spring 33. The valve assembly also includes body shoulder 34, threads 35, body 36, and passage 38 within body 36 and openings 38a in body 36. Resin or another component of the sprayed product moves from valve passage 38 through valve openings 38a into passage 39, passage 40, the grid mixing chamber, and out nozzle 17 when plunger 31 is depressed. Line 41 joins solvent valve assembly 42 and passage 40. Nut 43 joins head 3a and body 3 of gun 1.

FIG. 4a is an expanded view of the nozzle assembly. When plunger 31 is forced back by the trigger of the gun, ball 32 is moved away from valve seat 32a. Spring 33 acts against ball 32. Sleeve spacer 36a and retainer cap 36b help to hold the plunger in position. O-rings 37 are used to seal the assembly. The valve body preferably is of a straight dimension. The free floating ball can be made of stainless steel or a suitable plastic material. Resin flows from valve passage 38 through valve openings 38a and into passage 39.

FIG. 5 is an exploded side sectional view of the nozzle assembly and grid mixing chamber. Threads 43 of mixing nozzle or tube 44 engage threads 45 of spray gun head 3a. Openings 46 communicate with the mixing chamber within nozzle or tube 44 and with the passage means carrying air and catalyst from opening 23 in platform 19. Mixing grid or baffle 47 is removably positioned within the mixing nozzle 44. Baffle 47 includes axle 47a and radiating arms 47b. In the embodiment shown four arms radiate from the axle in a given plane. The arms define channels 47c. Nozzle 17 engages the head 48 of mixing nozzle 44. O-ring 49 is positioned between the mixing nozzle 44 and nozzle 17. O-ring 50 is positioned between the shoulder 51 of mixing nozzle 44 and shoulder 52 of spray gun head 3a. O-ring 53 also separates the mixing nozzle from the body of head 3a. Resin enters chamber 55 through opening 54 and passes through the center mixing nozzle 44. Channel 56 communicates with opening 14 in platform 19 by means of passage 56'. In the embodiment shown in this figure, no air passes from channel 56 to the nozzle. When spraying foam materials, however, channel 56 communicates with nozzle 17. Collar 18 locks nozzle 17 in place.

FIG. 6 is a top plan view partially in section. In this view, platform 19 is shown as including openings 14, 20, 21, 22, and 23. Flush buttons 15 and 24 are attached to plungers 57 and 58. When the buttons are depressed, ball 59 and ball 60 are moved away from valve seats 61 and 62 allowing solvent to pass from hose connection 10 through channels 40 and 63 and out nozzle 17. The valve assemblies include body shoulder 64 and 65, threaded portion 66 and 67, and openings 68 and 69 of bodies 70 and 71. When the plungers are depressed, spring 72 is contracted allowing solvent to flow through the grid mixing chamber and out the nozzle. Nut 43 and thread 73 join head 3a and body 3 of gun 1. Resin flowing from opening 21 passes through channels 40 and 74 into chamber 55 through opening 54 and axially through mixing nozzle 44. Catalyst and air pass from opening 23 through channels 63 and 75 through openings 46 and mixing nozzle 44 whereupon the catalyst is mixed with resin coming from opening 21. Channel 39a connects the air passage beginning at opening 22 with opening 14 and passage 56'.

FIG. 7 is a detailed view of a portion of a nozzle assembly. Nozzle body 44 includes threads 43, tube insert 44a, openings 46, head 48, shoulder 51, and nut 76. O-rings 49, 50, 53 and 77 provide a seal for the nozzle assembly.

FIG. 7a is a detailed sectional view of a nozzle assembly that is used for foam application such as in spraying polyurethane. Fluid A enters passage A defined by tube insert 44a. Fluid B enters passage 46 and joins fluid A beyond tube insert 44a. Air enters air passage 56a and 56b from passage 56 (see FIG. 5). A front view of the nozzle assembly would show a series of (3–6) of openings around passage A'. The air mixes with fluids A and B beyond passage A' and before the foam passes through nozzle 17.

FIG. 8 is a sectional view taken through line 8—8 of FIG. 4. This view shows passage 29, ball 32, spring 33 and valve seat 32a. The plunger and valve assembly are held in place by body shoulder 34. Opening 38a in body 36 provides a passageway for resin flowing from channel 29 through the flow lines in the gun and out the nozzle. Opening 22 communicates with an air line and an air pump. Air flows from the opening through channel 78 when plunger 79 is depressed. Plunger 79 actuates ball 80 which is engaged by spring 81. Body 82 includes openings 83 which communicate with passage 39a. The valve assembly is held in place by body shoulder 84. Channel 85 communicates with opening 23 of platform 19. The valve assembly includes ball 86, spring 87, valve body 88, openings 89, body shoulder 90 and plunger 91. Each of the plungers engages selector bar 6. The special selective trigger allows the operator of the gun to use all components at once or each component separately. As was pointed out above, the selector bar can be fixed in any of three positions. When the selector bar is in the middle position (horizontal) it will push on all three valves when the trigger is depressed to its limit. By moving the selector bar in a clockwise direction, resin will be released without catalyst. By placing the selector bar in the horizontal position and pulling the trigger one-third of its total travel, catalyst and air are sprayed alone. By pulling the trigger two-thirds of the way, the catalyzed resin can be sprayed alone.

FIG. 9 shows the gun in operation along with roving cutter 26. The cutter is mounted by means of ¼" No. 28 bolt secured by nut 27 placed through an opening in gun body 3 immediately behind the trigger axle. The cutter should be so placed that the chopped glass is blown into the resin pattern about one foot from the fluid tip. Air is delivered to the cutter by means of air line 26a.

As was pointed out above, one of the principal objectives of the subject invention is to provide a lightweight hand-held spray gun which is capable of spraying a variety of thermosetting plastics, catalyzed glues, gel coats, liquid foams, etc. One of the unique features of the gun is that the hose connections are arranged on a platform such that it is possible to use an overhead boom or over the shoulder technique to accommodate the air lines, resin lines, etc. This arrangement greatly increases the mobility of the operator.

The spray gun is designed to handle up to four components at one time. An example of such an operation would be the spraying of polyester resins. In this case, the resin would be delivered directly from a drum by a high pressure pump to the gun body. Using the clock face principal and looking from the back of the gun, the resin would enter the opening at the nine o'clock position. The resin would then be directed down to the left hand valve. This valve and the valve located on the right hand side can be opened simultaneously by pulling the trigger. In operation, resin would continue through a transfer tube to the base of the nozzle in the gun head. Vaporized catalyst, coming from a vaporizing catalyst injector, enters the opening in the platform at the three o'clock position. The catalyst would follow a route through its own valve, transfer tube and into the gun head. Within the gun head atomizing air carrying the vaporized catalyst meets the polyester resin and the three components are homogeneously mixed through the grid or mixing chamber. The catalyst resin is then blown clear of the gun by the air that previously carried the vaporized catalyst to the gun. Using this technique, it is possible to eliminate approximately 90% of the objectionable odor which comes from sprayed catalysts used in other systems.

Because the spray gun includes an internal mixing head, the residual catalyzed resin must be washed out almost immediately with a solvent. This is accomplished through the use of the solvent valve system described above. When one of the flush buttons is depressed, solvent from a pressure pot or some other source enters the opening in the platform at the 12 o'clock position, flows around the resin valve or the catalyst valve through the transfer tubes and out of the grid chamber and nozzle. The solvent flush buttons can both be depressed at once or the sides can be purged alternately. It is preferred that clear, unused acetone be employed for this purpose.

Another feature of the gun is its single hand operation. The trigger when depressed two-thirds will spray the catalyzed resins described above. When the trigger is pulled the remaining distance it opens a third valve located in the center of the gun body. This valve controls an air source which enters the gun body through the opening in the platform at the six o'clock position. When a glas reinforced laminate is being formed, the air is directed through a series of passages to a pneumatic cutter motor. The cutter chops up glass strands which are then sprayed into the atomized resin pattern. When the cutter is being used, the air passage is blocked off at a third chamber in the resin nozzle thereby causing all of the air to be delivered to the cutter motor. The nozzle described in the drawing corresponds to this nozzle.

When the gun is to be used in connection with polyurethane foams or the like, a cutter generally is not employed. By removing the cutter and inserting a plug in its air line and replacing the polyester nozzle with a foam nozzle, air that would normally have gone to the cutter motor is directed into the atomized air cap through channel 56 where it atomizes the foam resins and blows them free of the gun.

In order to change the gun to a two-component or a two-pot resin system it is only necessary to change the setting at the three o'clock position to a larger resin hose size. When the trigger is then depressed resin A will be allowed to travel through the left hand side, and resin B will be allowed to travel through the right hand side. The two resins meet at the grid chamber where they are tumbled and kneaded until they are thoroughly mixed. The mixed resin then proceeds into the air cap where the atomizing air opened by the middle valve will deliver the resins free of the gun in an atomized form.

A still further feature of the subject gun lies in the selective trigger arrangement. The trigger is attached to a selector bar. The bar is held in place on the trigger by an axle around which it may rotate a given number of degrees in either direction. The rotation is controlled and limited by three notches at the top of the selector bar. When the selector bar is in the middle position and the trigger is pulled, the bar contacts the three valves discussed above. When the selector bar is rotated in a clockwise direction as seen by the operator, the bar will operate only the left hand valve. When the bar is rotated in a counter-clockwise direction it will operate only the air valve which, in turn, will operate either the cutter for blowing the glass roving or will blow atomizing air from the front of the gun depending upon the particular nozzle that has been installed. The selector bar is so designed that the right hand valve is opened approximately 1/8" in travel before the left hand valve when the selector bar is in the middle position. Therefore, by a careful squeezing of the trigger the operator may check his flow on the right hand side of the gun at will before the left hand valve is opened.

In the subject gun all pressures are held downstream of the nozzle. For this reason, when the valves are closed the nozzle may be removed or changed with full pressure on the system. This differs from conventional guns in which a large needle valve shuts off the resin or fluid directly at the tip of the gun. The latter arrangement makes it necessary to bleed off all the resin or fluid in the lines when the nozzle is changed.

The gun can be disassembled rapidly by means of nut 43 which is located directly behind gun head 3a. When this nut is removed the resin head is free and at the same time the transfer tubes will slip out. The only other parts that may be removed are the individual valves which simply unscrew as a complete unit. All other passages and transfer lines are built completely within the gun body.

Another of the important features of the gun is the unique design of the mixing tube. The removable baffle, the radially disposed openings between the surrounding chamber and the interior of the tube, and preferably along with the tube insert, cause the various fluids to mix in a highly satisfactory manner prior to leaving the gun through the spraying nozzle.

Obviously many modifications and variations of the invention as hereinbefore set forth may be made without departing from the spirit and scope thereof, and therefore only such limitations should be imposed as are indicated in the appended claims.

We claim:

1. Valve and valve operating means for a spray gun which comprises in combination: a trigger pivotally mounted on the body of said spray gun; a selector bar rotatably mounted on said trigger, and three substantially horizontally disposed valve means removably positioned within the body of said gun, said selector bar having two valve contact points, said contact points being positioned so as to engage a plunger of a valve means, said trigger including a contact point, said trigger contact point being positioned so as to engage the plunger of a valve located between said valves engaged by the contact points of said selector bar, said plunger of one of said valves being so positioned as to engage the contact point of said selector bar slightly before the plunger of the second valve engages said selector bar, said selector bar having three fixed positions, one of said positions being such that neither of said selector bar contact point are capable of engaging said valve plungers, the second of said positions being such that one of said contact points is capable of engaging a plunger, and the third of said fixed positions being such that both of selector bar contact points are capable of engaging said plungers.

2. A spray gun which comprises in combination: a body, a handle attached to said body, and a gun head attached to said body, said gun including a plurality of openings for accommodating hose connections and a plurality of channels in communication with said openings for conveying spray components; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; and a nozzle operatively associated with said mixing chamber.

3. A spray gun which comprises in combination: a body, a handle attached to said body, and a gun head attached to said body, said gun including a plurality of openings for accommodating hose connections and a plurality of channels in communication with said openings for conveying spray components; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; a nozzle operatively associated with said mixing chamber; and means for passing solvent through said flow tubes, mixing chamber, and out said nozzle, said means including a channel in communication with one of said openings for accommodating hose connections, additional valve means within said chamber for controlling the flow of solvent through said channel, and means on said gun for operating said valve means.

4. A spray gun which comprises in combination: a body, said body including a plurality of openings for accommodating hose connections and a plurality of channels in communication with said openings for conveying spray components; a handle attached to said body; a gun head attached to said body; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; and a nozzle operatively associated with said mixing chamber.

5. A spray gun which comprises in combination: a body, said body including a plurality of openings for accommodating hose connections and a plurality of channels in communication with said openings for conveying spray components; a handle attached to said body; a gun head attached to said body; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; a nozzle operatively associated with said mixing chamber; and means for passing solvent through said flow tubes, mixing chamber, and out said nozzle, said means including a channel in communication with one of said openings for accommodating hose connections, additional valve means within said chamber for controlling the flow of solvent through said channel, and means on said gun for operating said valve means.

6. A spray gun which comprises in combination: a body, said body including a substantially flat platform area, said platform area being angled from about 30 to about 60° from horizontal, said platform area including a plurality of openings for accommodating hose connections, a plurality of channels in communication with said openings for carrying spray components; a handle attached to said body; a gun head attached to said body; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; and a nozzle operatively associated with said mixing chamber.

7. A spray gun which comprises in combination: a body, said body including a plurality of openings for accommodating hose connections and a plurality of channels in communication with said openings for conveying spray components; a handle attached to said body; a gun head attached to said body; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; a baffle movably positioned within said mixing chamber, said baffle defining a discontinuous cylinder having a series of spaced arms radiating from an axle, said arms defining channels through which fluid can pass; and a nozzle operatively associated with said mixing chamber.

8. A spray gun which comprises in combination: a body, said body including a substantially flat platform area, said platform area being angled from about 30 to about 60° from horizontal, said platform area including a plurality of openings for accommodating hose connections; a plurality of channels in communication with said openings for carrying spray components; a handle attached to said body; a gun head attached to said body; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; a baffle movably positioned within said mixing chamber, said baffle defining a discontinuous cylinder having a series of spaced arms radiating from an axle, said arms defining channels through which fluid can pass; a nozzle operatively associated with said mixing chamber; and means for passing solvent through said flow tubes, mixing chamber, and out said nozzle, said means including a channel in communication with one of said openings for accommodating hose connections, additional valve means within said chamber for controlling the flow of solvent through said channel, and means on said gun for operating said valve means.

9. A spray gun which comprises in combination: a body, a handle attached to said body; and a gun head attached to said body, said gun including a plurality of openings for accommodating hose connections and a plurality of channels in communiaction with said openings for conveying spray components; flow tubes connecting said body to said head; valve means for opening and closing said flow tubes; a trigger mounted on said gun; a bar movably mounted on said gun, said bar being operatively associated with said trigger and said valve means, said bar having an active position wherein a plurality of said valves are opened as said trigger and said bar are moved, said bar having a second position wherein a lesser number of valves are opened when said trigger and said bar are moved; a mixing chamber within said gun head in communication with said flow tubes; a baffle movably positioned within said mixing chamber, said baffle defining a discontinuous cylinder having a series of spaced arms radiating from an axle, said arms defining channels through which fluid can pass; a nozzle operatively associated with said mixing chamber; and means for passing solvent through said flow tubes, mixing chamber, and out said nozzle, said means including a channel in communication with one of said openings for accommodating hose connections, additional valve means within said chamber for controlling the flow of solvent through said channel, and means on said gun for operating said valve means.

10. A spray gun which comprises in combination: a body, said body including a plurality of openings for accommodating hose connections and a plurality of channels in communication with said openings for conveying spray components; a handle attached to said body; a gun head attached to said body; flow tubes connecting said body to said head; valve means for opening and closing said flow tubes; a first valve operating means on said gun for operating said valve means for said flow tubes; a mixing chamber within said gun head in communication with said flow tubes; a nozzle operatively associated with said mixing chamber; and means for passing solvent through said flow tubes, mixing chamber, and out said nozzle, said means including a channel in communication with one of said openings for accommodating hose connections, additional valve means within said gun for controlling the flow of solvent from said channel, and a second valve operating means on said gun for operating said solvent control valve means.

11. A spray gun which comprises in combination: a body, said body including a plurality of openings for accommodating hose connections and a plurality of channels in communication with said openings for conveying spray components; a handle attached to said body; a gun head attached to said body; flow tubes connecting said body to said head; valve means for opening and closing said flow tubes; a first valve operating means on said gun for operating said valve means for said flow tubes; a mixing chamber within said gun head in communication with said flow tubes; a nozzle operatively associated with said mixing chamber; and means for passing solvent through said flow tubes, mixing chamber, and out said nozzle, said means including a channel in communication with one of said openings for accommodating hose connections, dual valve means within said gun for controlling the flow of solvent from said channel, and a second valve operating means for operating said solvent control valve means, said second valve operating means consisting of two push buttons mounted on either side of said gun.

References Cited

UNITED STATES PATENTS

| | | | |
|---|---|---|---|
| 970,349 | 9/1910 | Owin | 239—432 |
| 1,049,222 | 12/1912 | Frear | 239—432 |
| 1,824,363 | 9/1931 | Norgren | 239—119 |
| 3,146,950 | 9/1964 | Lancaster | 239—112 |
| 3,157,361 | 11/1964 | Heard | 239—432 |
| 3,176,922 | 4/1965 | Decker | 239—112 |
| 3,179,341 | 4/1965 | Plos et al. | 239—112 |
| 3,226,036 | 12/1965 | Grahn | 239—432 |

FOREIGN PATENTS

| | | |
|---|---|---|
| 350,240 | 10/1905 | France. |

EVERETT W. KIRBY, *Primary Examiner.*

M. HENSON WOOD, JR., *Examiner.*

R. S. STROBEL, *Assistant Examiner.*